United States Patent [19]

Brax

[11] 4,069,032
[45] Jan. 17, 1978

[54] FOREHEARTH FOR GLASS FURNACE

[75] Inventor: Jean Albert Brax, Chalon sur Saone, France

[73] Assignee: Societe Generale pour l'Emballage, Paris, France

[21] Appl. No.: 772,023

[22] Filed: Feb. 25, 1977

[30] Foreign Application Priority Data

May 4, 1976  France ........................... 76 13261

[51] Int. Cl.$^2$ ..................... C03B 5/02; C03B 5/22
[52] U.S. Cl. ................................. 65/337; 65/346; 65/347
[58] Field of Search ................... 65/337, 346, 347

[56] References Cited

U.S. PATENT DOCUMENTS

| 1,557,148 | 10/1925 | Ferngren ............................ 65/85 |
| 1,879,718 | 9/1932 | Soubier .............................. 65/326 |
| 1,970,113 | 8/1934 | Wardley ............................. 65/128 |
| 2,471,531 | 5/1949 | McIntyre et al. .................. 13/18 |
| 2,658,093 | 11/1953 | LaBurthe ........................... 13/6 |
| 2,767,518 | 10/1956 | Schmid ............................... 65/346 |
| 3,248,203 | 4/1966 | Cunningham ..................... 65/337 X |
| 3,582,310 | 6/1971 | Avery et al. ....................... 65/346 |
| 3,999,972 | 12/1976 | Brax .................................... 65/337 |

FOREIGN PATENT DOCUMENTS

| 901,344 | 10/1944 | France. |
| 921,551 | 1/1947 | France. |
| 2,022,539 | 7/1970 | France. |
| 355,555 | 8/1931 | United Kingdom. |
| 735,222 | 8/1955 | United Kingdom. |
| 771,283 | 3/1957 | United Kingdom. |
| 1,003,026 | 9/1965 | United Kingdom. |
| 1,171,133 | 11/1969 | United Kingdom. |
| 1,291,630 | 10/1972 | United Kingdom. |

*Primary Examiner*—Arthur D. Kellogg
*Attorney, Agent, or Firm*—Pennie & Edmonds

[57] ABSTRACT

A forehearth for a glass furnace includes a roof having a plurality of longitudinal ridges depending therefrom. These define a central longitudinal channel lengthwise of which a current of cooling air flows between inlet and outlet ports to cool the central, hottest portion of the stream of glass in the forehearth, and side channels which serve to reheat the side portions of the stream of glass. A plurality of longitudinally spaced electrodes are suspended from the portions of the roof over the side channels and are inserted in the molten glass to directly heat the side portions. Advantageously the electrodes in one side channel are energized in pairs independently of the electrodes in the other side channel. Preferably the electrode assemblies are mounted in apertures extending through the roof. Molybdenum electrodes with air cooled tubular holders encircled by refractory tubes and isolated from ambient air are described.

9 Claims, 4 Drawing Figures

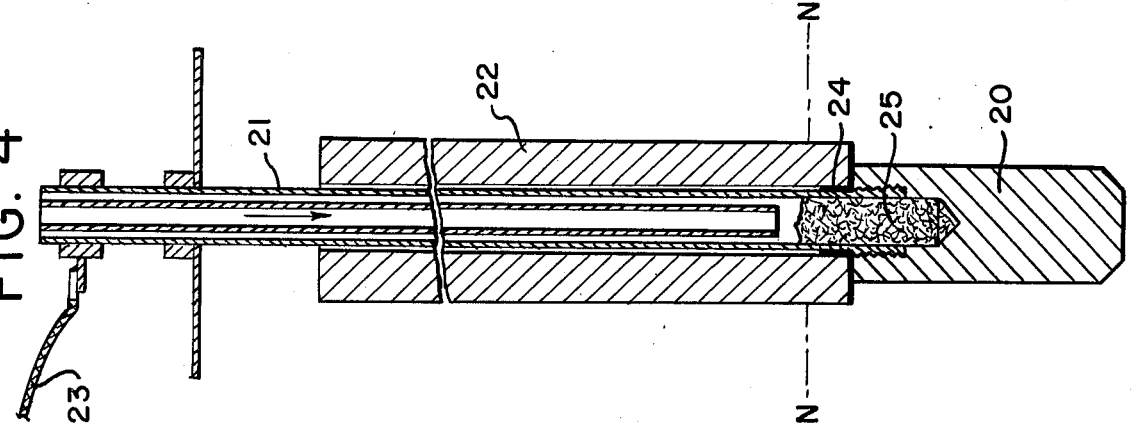
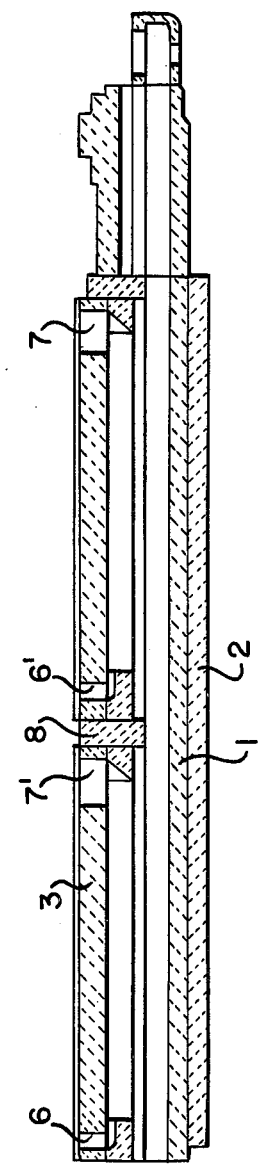
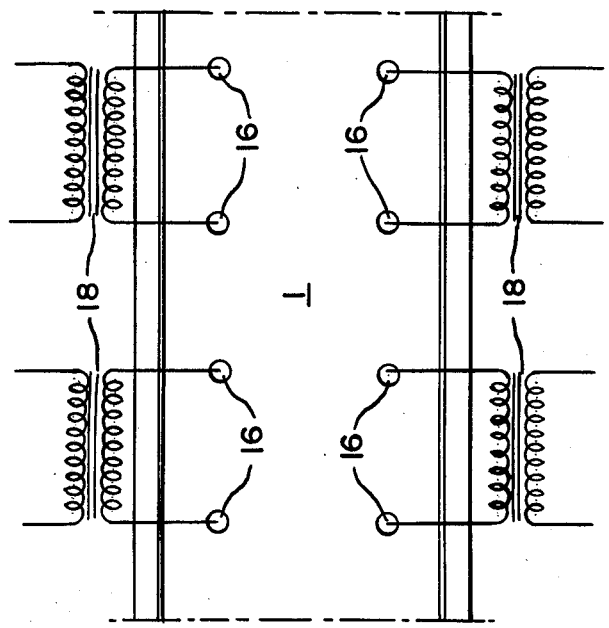
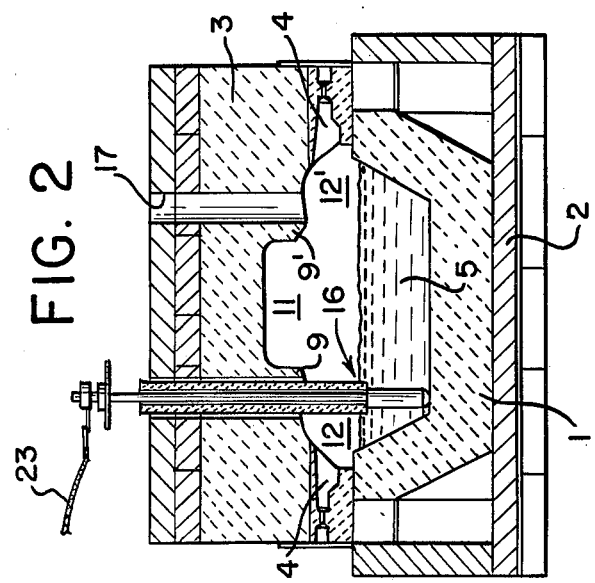

FOREHEARTH FOR GLASS FURNACE

This invention relates to apparatus for rendering more uniform the temperature of molten glass flowing in the forehearth of a glass furnace, and is an improvement on that described in U.S. appliction Ser. No. 607,707 filed Aug. 25, 1975, now U.S. Pat. No. 3,999,972, that application being a continuation of application Ser. No. 448,676, filed Mar. 6, 1974, now abandoned.

The above-identified application pertains to a method and apparatus for cooling and conditioning glass to achieve a flowing steam of glass of improved temperature homogeneity over the cross-section of the stream. The application thus pertains to forehearths for the distribution or delivery of molten glass, e.g. for delivery to feeders which in turn deliver gobs of glass to forming machines, and more particularly to a forehearth providing improved homogeneity in the temperature of the glass therein.

The high production rates which have been achieved in recent years in the manufacture of glass articles on automatic forming machines receiving glass from forehearths has entailed a rise in the temperature of the glass flowing through those forehearths and an increase in the temperature gradients across the channels of those forehearths. That application pertains to control of the temperature of melted glass in such forehearths and, more particularly to homogenization of the temperature of the glass, in the current flowing through the forehearth, over sections transverse of the direction of flow of that current.

It is known that in a forehearth there exists a temperature gradient between the middle or center of the molten glass current and the edges thereof. These temperature differences may amount to several tens of degrees at the outlet or feeder end of the forehearth. These differences of course are accompanied by differences in glass viscosity, which in turn result in substantial variations in the physical and chemical properties of the pieces, i.e. of the ware, manufactured from such glass.

That application surmounts this disadvantage by providing a forehearth having means to homogenize the temperature of the molten glass flowing through the forehearth, so as to reduce the temperature difference between the center portion of the glass current and the edge portions thereof.

According to the application, instead of effecting a transverse ventilation of the forehearth as has usually been common practice, there is effected a longitudinal ventilation thereof, by means of a cooling gas flow parallel to the longitudinal axis of the forehearth and concentrated over or along the middle thereof. The cooling gas flows over the central portion of the stream of molten glass in contact with the upper surface of the stream, so as preferentially to chill the central portion of the glass current, which is at the highest temperature.

According to that application, the roof or crown of the forehearth has formed therein two downwardly extending longitudinal ridges, disposed essentially symmetrically of the longitudinal vertical median plane of the forehearth. These ridges serve, with the remainder of the roof, to define three longitudinal channels in the space above the glass current. Of these, the central one serves to guide and concentrate the longitudinal gas flow just described. The two side channels promote a local convection of hot gases to reheat the side portions of the stream of glass, especially in forehearths equipped with lateral burners. Advantageously these burners may be supplemented by other heating means such as electrical resistances or burners disposed laterally in cavities in the floor or trough portion of the forehearth, to reheat the glass which flows along the edges of the glass current in the trough.

In accordance with the present invention, auxiliary means for heating the molten glass in the side channels comprises a plurality of longitudinally spaced electrodes which are inserted in the molten glass and which are supplied with electrical current. The electrodes are disposed in the vicinity of the channel sides and are suspended from the portions of the roof over the side channels. In this manner the side portions of the stream of glass are directly heated by electric current flowing therethrough.

Advantageously the electrodes are mounted in respective apertures extending through the portions of the roof over the side channels. Thus, when the electrodes are worn out it is possible to change them rapidly by removing them vertically and replacing them with equivalent elements.

To prevent electrical current from flowing in the central channel in which the glass, which has a higher temperature than at the sides, must be cooled and not heated, the electrodes disposed in one side channel are preferably supplied with current in pairs independently of the electrodes in the other side channel. Inasmuch as the resistivity of molten glass decreases very rapidly as the temperature is raised, if the electrodes in one side channel were not supplied independently of those in the other side channel, the electrical current would tend to flow across the trough so as to pass through the central zone where the molten glass has lowest electrical resistance, and therefore a large portion of the calorific energy would be dissipated in the central zone, thus producing the opposite result to that desired.

Other objects, features and advantages of the present invention will be made apparent in the course of the following detailed description thereof provided with reference to the accompanying drawings, in which:

FIG. 1 is a diagrammatic longitudinal cross-section through a forehearth in which the present invention may be used;

FIG. 2 is a diagrammatic lateral cross-section through a forehearth according to the present invention;

FIG. 3 is a diagram illustrating the electrical supply to the various electrodes; and FIG. 4 is an axial section, on a larger scale, of an electrode assembly.

Referring first to FIGS. 1 and 2, a forehearth is shown including a trough 1, thermally insulated from the outside by a refractory insulating layer 2, and a vault or roof 3. This roof is provided on opposite sides of the trough, in a manner known per se, with burners or burner nozzles 4, serving to reheat the portions of the molten glass 5 which are closest to the lateral edges of the flow channel defined by the trough 1. The forehearth is ventilated longitudinally by means of a current of cooling air directed over and along the central portion of the trough, in order to chill the glass therein which is at a higher temperature than glass along the sides of the trough.

The roof is apertured at longitudinally spaced locations 6 and 7 for the entrance and exhaust of the air or other gas by means of which this ventilation is effected. As indicated in FIG. 1, the forehearth may include a transverse bridge 8 extending partway down from the roof toward the glass and effecting a partial division of the space above the glass into upstream and downstream sections. In such a construction, additional similar apertures 6' and 7' may be provided immediately downstream and upstream of the bridge 8 to permit operation of one ventilation current between apertures 6 and 7' and another between apertures 6' and 7.

In order to guide the air current, the roof 3 comprises two ridges 9, 9' which extend downwardly toward the glass and longitudinally of the forehearth. The two ridges are disposed substantially symmetrically with respect to the longitudinal vertical median plane of the forehearth, this being the section plane of FIG. 1. In the drawing, the ridges are schematically shown as being integral with the remainder of the roof. They may however be made up separately of refractory material like the remainder of the roof, and affixed thereto.

The ridges 9, 9' divide the roof into three portions, defining longitudinal channels 11, 12 and 12' in the space above the glass in trough 1 and beneath the roof. The channel 11, to which the apertures 6, 6', 7 and 7' of FIG. 1 give access, is located over the center portion of trough 1 and hence over the center portion of the glass current flowing longitudinally of the trough. It thus guides and concentrates over the hottest, central portion of the glass current the longitudinal current of ventilation and cooling air or other gas. The side channels 12 and 12' form reverberation vaults for the heat to reheat the edge portions of the glass. The combustion gases produced by the laterally disposed burners 4 designed to heat the glass in the vicinity of the trough sides also flow through the channels 12 and 12'.

According to the invention, two sets of vertical electrode assemblies 16 are longitudinally spaced along respective side channels 12 and 12', and the electrodes are inserted in the molten stream of glass for the purpose of heating the glass in the region of the side channels. These electrodes are suspended from the portions of the roof over the side channels, by mounting the assemblies in apertures 17.

As indicated in FIG. 3, the electrodes 16 disposed on one side of the trough 1 are energized in pairs by means of separate transformers 18, independently of the electrodes disposed on the other side of the trough. As described above, it is thus possible to prevent electric current from passing through the central part of the trough where the temperature of the molten glass is highest and where its resistivity is lowest.

FIG. 4 shows a preferred electrode assembly for implementing the invention. The electrode per se 20 is a molybdenum electrode and is screwed onto a steel electrode holder 21 protected externally by an encircling protective tube 22 made of a refractory material, for example, sillimanite. The electrode 20 can take different forms (cylindrical, frusto-conical, etc.), so as to provide heating of different intensity according to the glass bath. More particularly, the lower end of electrode 20 may increase in cross-sectional area, such as in frusto-conical configuration, so as to concentrate the flow lines and consequently the heating in the base of the trough. The tube 21 preferably has a double wall so as to permit internal circulation of cooling air as indicated by the arrow. The electricity supply cable 23 is attached to the electrode holder. As molybdenum is particularly combustible at the temperature prevailing in the trough, it is necessary to prevent any contact of the electrode 20 with the ambient air. The electrode is thus completely immersed in the molten glass, whose level is indicated at N, and a part of which is imprisoned at 24 between the electrode holder 21 and the protective tube 22. When the electrodes are placed in position, the electrode 20 affixed with the electrode holder 21 is first inserted in the molten glass and the protective tube 22 is then attached, thus imprisoning at the base a small volume 24 of molten glass which forms a joint. For the same reason, a filling of glass or fusible metal 25 is provided inside the tube 21 at the base of the same so as to ensure sealtightness.

As indicated above, when it is desired to replace an electrode, the electrode is removed vertically and replaced with an equivalent element. It is thus possible to avoid the disadvantages of conventional auxiliary heating systems for feeders which comprise electrodes integral with the base of the channel which causes serious problems when they have to be replaced.

I claim:

1. A forehearth for the conveyance of molten glass which comprises a trough and a roof over the trough, said roof having at least two longitudinal ridges extending downwardly from the roof and disposed substantially symmetrically on opposite sides of the vertical median plane of the trough to define in the space below the roof a central channel over the central portion of a stream of molten glass flowing through the trough and side channels on respective sides of the central channel over respective side portions of the stream of glass, longitudinally spaced inlet and outlet apertures in the roof over said central channel for the ingress and egress of a gaseous cooling fluid whereby the fluid flows over the central portion of the stream of molten glass in contact with the upper surface of the stream, the portion of said roof over said central channel between said apertures being substantially closed, and means disposed along the sides of said trough for applying heat to the side portions of the stream of glass, said means including a plurality of longitudinally spaced electrodes inserted in respective side portions of the molten stream of glass, said electrodes being suspended from the portions of the roof over said side channels, and means for energizing said electrodes to produce electric current flow through the molten glass in said side portions.

2. A forehearth according to claim 1 in which the electrodes in one side channel are energized in pairs independently of the electrodes in the other side channel.

3. A forehearth according to claim 1 in which said electrodes are mounted in respective apertures extending through said portions of the roof.

4. A forehearth according to claim 3 in which said electrodes are of molybdenum and are affixed with respective holders extending through respective apertures in the roof, said electrodes being energized through said holders respectively, each holder being encircled by a protective tube of refractory material.

5. A forehearth according to claim 4 including means for circulating cooling air through said holders respectively.

6. A forehearth according to claim 4 including means for sealing the molybdenum electrode in the respective holder and protective tube to isolate the molybdenum electrode from ambient air during use, the exposed area of the molybdenum electrode being totally immersed in the molten glass during use.

7. A forehearth according to claim 1 in which the lower ends of the portions of the electrodes immersed in the molten glass increase in cross-sectional area.

8. A forehearth for the conveyance of molten glass which comprises a trough and a roof over the trough, said roof having at least two longitudinal ridges extending downwardly from the roof and disposed substantially symmetrically on opposite sides of the vertical median plane of the trough to define in the space below the roof a central channel over the central portion of a stream of molten glass flowing through the trough and side channels on respective sides of the central channel over respective side portions of the stream of glass, longitudinally spaced inlet and outlet apertures in the roof over said central channel for the ingress and egress of a gaseous cooling fluid whereby the fluid flows over the central portion of the stream of molten glass in contact with the upper surface of the stream, the portion of said roof over said central channel between said apertures being substantially closed, and means disposed along the sides of said trough for applying heat to the side portions of the stream of glass, said means including a plurality of longitudinally spaced electrodes inserted in respective side portions of the molten stream of glass, said electrodes being of molybdenum and being affixed with respective holders extending through respective apertures in the portions of the roof over said side channels, each holder being encircled by a protective tube of refractory material, means for circulating cooling air through said holders respectively, means for sealing the molybdenum electrodes in the respective holders and protective tubes to isolate the molybdenum electrodes from ambient air during use, the exposed area of the molybdenum electrodes being totally immersed in the molten glass during use, and means for energizing said molybdenum electrodes through respective holders, the electrodes in one side channel being energized independently of the electrodes in the other side channel.

9. A forehearth according to claim 8 in which the lower ends of the portions of the electrodes immersed in the molten glass increase in cross-sectional area.

* * * * *